Nov. 24, 1959     H. A. TOULMIN, JR     2,913,993

HIGH TEMPERATURE HYDRAULIC PUMP

Filed May 18, 1953     2 Sheets-Sheet 1

*INVENTOR.*
HARRY A. TOULMIN JR.
BY *Toulmin & Toulmin*
ATTORNEYS

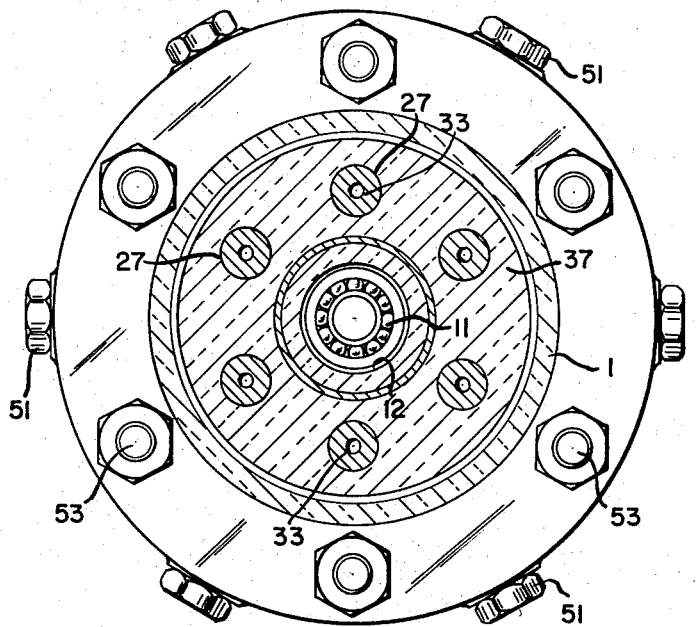
FIG.-3
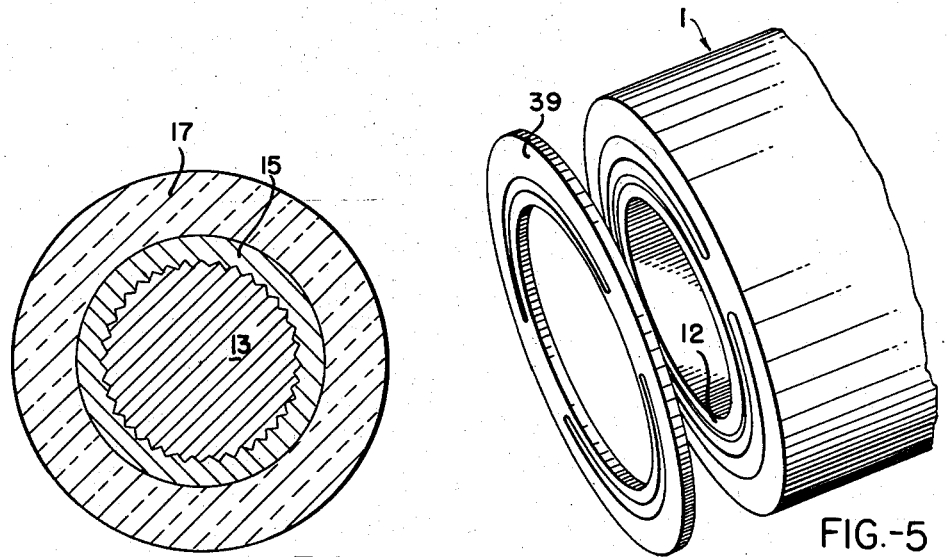
FIG.-4
FIG.-5

United States Patent Office 2,913,993
Patented Nov. 24, 1959

2,913,993

HIGH TEMPERATURE HYDRAULIC PUMP

Harry A. Toulmin, Jr., Dayton, Ohio, assignor to The Commonwealth Engineering Company of Ohio, Dayton, Ohio, a corporation of Ohio Application May 18, 1953, Serial No. 355,434

3 Claims. (Cl. 103—162)

This invention relates to pumps which are particularly adapted for use in aircraft; more specifically the invention relates to high pressure pumps of low weight characteristics and which are capable of withstanding elevated temperatures.

Pumps for aircraft necessarily have stringent requirements—they must for example operate at high speed and pressure while maintaining high volumetric and mechanical efficiencies and must at the same time occupy a minimum of space; further, the components of the pumps must have sufficient strength even at relatively high temperatures to withstand the high stresses induced by the severe operational requirements. The demand that these features be fulfilled in a pump of low total weight has resulted in much attention to the problem.

It has now been found that the use of glass-reinforced plastics affords a solution to this problem, and it is accordingly within the contemplation of this invention to describe a novel pump the major components of which are formed of resin impregnated fiber glass.

The glass material used in the preparation of the product may be any of several weights and is preferably, although not necessarily, in fabric form. Glass cloth, designated in the trade as "181" is preferred as it is readily handled and may be used in either low or high pressure processes; glass types "126," "128" and even the open weave "261" may be employed however. Where desired chopped glass fibers may be combined with a resin in fluid form for use as a molding compound and is adaptable generally to transfer and compression molding processes.

The resin impregnant is preferably a silicone or a polyester. The silicones are preferred, generally speaking, as they not only bond well but are subject to being bonded under relatively low pressures—that is about 30 pounds per square inch at 250° C. without a catalyst. They also offer the advantage over the polyesters of a less complicated pre-treatment with respect to the glass to attain the same degree of moisture absorption resistance in the product.

The silicone bonding materials are also advantageous in that they may be given a short drying time or pre-cure after impregnation into the glass and the material then has sufficient mechanical strength to permit of pre-forming. Thus the various components of the pump may be readily pre-shaped accordingly reducing pressure requirements and facilitating the production of parts of complex contours.

While many of the structural parts of the pump may be produced with the impregnated glass fabric the housing affords the opportunity for greatest weight reduction since it will in general be the largest of the elements subject to the invention. The housing may be preformed as will be noted with greater particularity hereinafter and then cured to a permanent set; on the other hand a resin-chopped glass mixture may be used in a transfer molding process to form the housing.

The housing, as well as the other components produced in accordance with the invention, may be machined as required for integration of the various parts. Thus the hardened material may be tapped, threaded, counter bored, punched, filed and ground, sheared, drilled, slotted and so forth. In fact with the exercise of care any machine operation may be performed on the cured material.

In general the moving parts of the pump will be of metal, and in those instances where the thrust is taken by the impregnated body under such condition that it may be subjected to wear, the wear surface may be a gas-plated metal which adheres well to the glass body. Gas plated metal is metal deposited by the thermal decomposition of gaseous metal bearing compounds and is noted for its adherence qualities.

The finished component whatever its specific nature will be lighter than a corresponding metallic component, will have ample strength under all conditions of use, is heat and chemically resistant, will age well without loss of strength, and is generally satisfactory and particularly so for aviation purposes.

The invention will be more fully understood by reference to the following detailed description and accompanying drawings wherein:

Figure 3 is a sectional view taken on line 3—3 of Figure 2;

Figure 4 is a sectional view taken on line 4—4 of Figure 2; and

Figure 5 is a perspective view illustrating the port plate arrangement of the pump.

Figure 2:
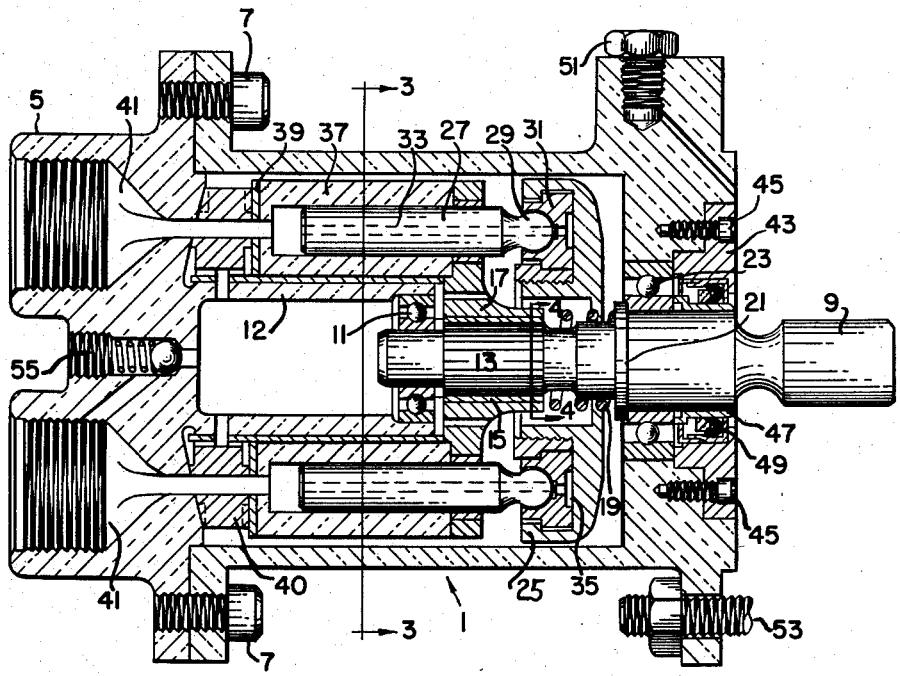
Figure 2 is a view, partially in section, of the pump of Figure 1.
Figure 1:
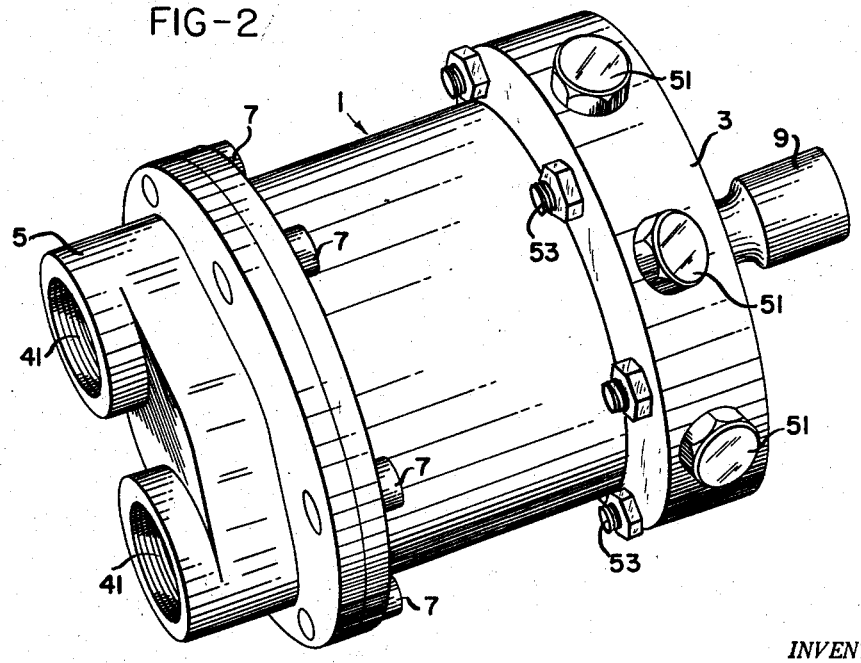
Figure 1 is a perspective view of a pump incorporating features of this invention.

Referring to the drawings there is shown in Figure 1 a cup-shaped pump housing body member 1 having a head portion 3 and an end plate portion or fluid distribution head 5 secured thereto by bolts 7. A shaft 9 extends into the pump head 3 and is shown in Figure 2 as rotatably journaled in bearings 11 mounted in a wall 12. Portion 13 of the shaft 9 is splined (Figure 4) to a sleeve 15 which is rotatable within a cylindrical impregnated glass fiber body 17. The spring 19 engages the shaft at shoulder 21 and serves to retain the same against the head portion at bearing 23.

A wobble plate 25 also surrounds the shaft and is adapted to be securely fixed in any suitably angular relationship therewith. The pistons 27 having head portions 29 are secured in an insert 31 of the wobble plate 25 and channels 33 are provided through the piston and insert and in interconnecting relation to the apertures indicated at 35.

A substantially cylindrical and annular body member of fiber glass 37 having a metallic port plate 39 supports the pistons 27 in longitudinal bores in the body member and the interior walls of the body 37 may be suitably metalized in order to reduce the friction attendant the movement of the pistons 27 through the walls of the body 37. Member 40 positioned adjacent the port plate 39 retains the latter in position with respect to the end plate 5 having ports 41 for the flow of liquid to and from the pump.

Bearing 23 as shown at the right in Figure 1 is retained in position by a cap 43 which is secured to the head 3 by suitable screws 45. A metallic body 47 supports the shaft 9 within the cap 43 and is suitably provided as at 49 with a gasket for the prevention of leakage. Bolts 51 are provided in the housing 3 and bolts 53 are suitably positioned for securing the pump to a stationary support, as for example, a bulkhead (not shown) in order to permit rotation of the wobble plate within the housing.

In the production of the structural components including the housing 1, the head portion 3, the end plate or portion 5, the body 17, the cap 43, the particular molding method employed will be dependent upon the nature of the resin impregnated glass fiber; if a resin-chopped glass mixture is employed considerable leeway is attained in the selection of the molding process due to the ready fluidity of the material. Thus the inventive concept is not limited to particular molding details as compression molding, transfer molding, jet molding or injection molding may suitably be employed for the attainment of economical production.

Retaining means such as screw threads, and bolt holes may be molded into the parts if desired; otherwise the material may be machined to provide the same after molding is completed. However as the openings will generally be large it is preferred to suitably core and to form threads during the molding operation.

The molded bodies may be conveniently produced by a pre-form process. Thus for example chopped glass fibers may be introduced into a pre-form having an inner contour of the part to be molded; thereafter the resin may be applied to the fibers and then subjected, in the case of thermosetting resins such as the phenolics, to heat and pressure.

Thermoplastic resins may also be applied to the fibers and formed into the desired shape; for most purposes however the thermosetting resins are to be preferred.

It will be understood that this invention is susceptible to modification in order to adopt it to different usages and conditions and accordingly, it is desired to comprehend such modifications within this invention as may fall within the scope of the appended claims.

I claim:
1. In a light-weight pump, a three member unit consisting of a cup-shaped body member of preformed resin-impregnated glass fiber laminate; an annular body member of preformed resin-impregnated glass fiber laminate arranged in said cup-shaped body member and having a plurality of parallel bores adapted to receive pistons; and a fluid distribution head in the form of an end plate member of preformed resin-impregnated glass fiber laminate for closing said cup-shaped body member, said distribution head being formed with chamber means adapted to communicate with said bores of said annular body member, whereby said three member unit may be used in association with pistons slidably arranged in said bores and with means for reciprocating said pistons in said bores.

2. In a light-weight pump, a three member unit consisting of a cup-shaped body member of preformed resin-impregnated glass fiber laminate; an annular body member of preformed resin-impregnated glass fiber laminate fixedly arranged in said cup-shaped body member and having a plurality of parallel bores adapted to receive pistons; and a fluid distribution head in the form of an end plate member of preformed resin-impregnated glass fiber laminate for closing said cup-shaped body member, said distribution head being formed with a plurality of chambers communicating with said bores of said annular body member, respectively, whereby said three member unit may be used in association with pistons slidably arranged in said bores and with means for reciprocating said pistons in said bores.

3. In a light-weight pump, a three member unit consisting of a cup-shaped body member of preformed resin-impregnated glass fiber laminate; an annular body member of preformed resin-impregnated glass fiber laminate arranged in said cup-shaped body member and having a plurality of parallel bores adapted to receive pistons, said bores being metalized for reducing the friction between the interior surfaces of said bores and pistons slidably arranged therein; and a fluid distribution head in the form of an end plate member of preformed resin-impregnated glass fiber laminate for closing said cup-shaped body member, said distribution head being formed with chamber means adapted to communicate with said bores of said annular body member, whereby said three member unit may be used in association with pistons slidably arranged in said metalized bores and with means for reciprocating said pistons in said metalized bores.

References Cited in the file of this patent

UNITED STATES PATENTS

| 2,241,701 | Doe | May 13, 1941 |
| 2,304,182 | Lang | Dec. 8, 1942 |
| 2,504,388 | Braley | Apr. 18, 1950 |
| 2,632,752 | Anderson | Mar. 24, 1953 |
| 2,633,104 | Lauck | Mar. 31, 1953 |

FOREIGN PATENTS

| 543,619 | Great Britain | Mar. 5, 1942 |
| 548,998 | Great Britain | Nov. 2, 1942 |
| 662,105 | Great Britain | Nov. 28, 1951 |

OTHER REFERENCES

Steel (publication), volume 113, No. 16, pages 120, 121 and 124, printed October 19, 1953.

Product Engineering, December 1948 (Thermosetting Plastic Laminates), part 1, pages 123 to 126.

Product Engineering, February 1949 (Thermosetting Plastic Laminates), part 2, pages 138 to 143.